(12) United States Patent
Tabuchi et al.

(10) Patent No.: US 6,488,378 B1
(45) Date of Patent: Dec. 3, 2002

(54) IMAGING APPARATUS

(75) Inventors: Toshiaki Tabuchi, Okayama (JP);
Hideki Ishinaga, Osaka (JP);
Takamasa Yoshikawa, Osaka (JP);
Toshiyuki Ueda, Osaka (JP); Isao Kakuhari, Nara (JP); Kenichi Terai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/743,664
(22) PCT Filed: May 26, 2000
(86) PCT No.: PCT/JP00/03431
§ 371 (c)(1),
(2), (4) Date: Apr. 16, 2001
(87) PCT Pub. No.: WO00/73850
PCT Pub. Date: Dec. 7, 2000

(30) Foreign Application Priority Data

May 28, 1999 (JP) .......................................... 11-149898

(51) Int. Cl.$^7$ .............................................. G03B 21/18
(52) U.S. Cl. .......................................... 353/52; 353/58
(58) Field of Search .............................. 353/57, 58, 59, 353/60, 61, 75, 119, 56, 52; 362/345, 295, 294

(56) References Cited

U.S. PATENT DOCUMENTS

| 5,448,645 A | * | 9/1995 | Guerci ................ 381/71.14 |
| 5,676,442 A | * | 10/1997 | Fujimori .................. 353/119 |
| 5,860,719 A | * | 1/1999 | Suzuki et al. ............... 353/52 |
| 5,900,982 A | * | 5/1999 | Dolgoff et al. ............. 349/62 |

FOREIGN PATENT DOCUMENTS

| EP | 0 829 750 A2 | * | 3/1998 | ........... G03B/21/16 |
| JP | 3-34373 | | 4/1991 | |
| JP | 8194201 | | 7/1996 | |
| JP | 11-082393 | | 3/1999 | |

* cited by examiner

*Primary Examiner*—Russell Adams
*Assistant Examiner*—Andrew Sever
(74) *Attorney, Agent, or Firm*—Snell & Wilmer, LLP

(57) ABSTRACT

An imaging apparatus including a projection section for projecting an image onto a screen, a cooling section for cooling the projection section by means of air, and an exterior cabinet for housing the projection section and the cooling section. The imaging apparatus further includes an exhaust section for exhausting the air used for the cooling of the projection section by the cooling section, from the exterior cabinet. The exhaust section has a function for attenuating a noise caused by the cooling section.

20 Claims, 20 Drawing Sheets

FIG.15

| Implemented region of the present invention | | | Noise measurement part | | | | |
|---|---|---|---|---|---|---|---|
| Cabinet | Exhaust duct (Sound absorbing material) | Active muffling device | Front | Right | Rear | Left | Top |
| Prior art | Absent | Absent | 52.7 | 52.8 | 57.0 | 51.2 | 58.3 |
| Prior art | Provided | Absent | 51.3 | 50.0 | 50.0 | 49.5 | 57.0 |
| Present invention | Provided | Absent | 40.5 | 38.2 | 44.3 | 40.9 | 40.6 |
| Present invention | Provided | Provided | 39.5 | 36.7 | 39.9 | 38.1 | 40.0 |

(dBA), at 1m

IMAGING APPARATUS

TECHNICAL FIELD

The present invention relates to an imaging apparatus, and specifically the present invention relates to an imaging apparatus having an exhaust section which exhausts air used by a cooling section for cooling a projection section to the outside of an exterior cabinet.

BACKGROUND ART

A cooling device for a conventional projection-type imaging apparatus will now be described with reference to the drawings.

In reference to FIGS. 21 and 22, a projection-type imaging apparatus 2100 includes a projection section 2202 for projecting an image onto a screen, a cooling section 2203 for cooling the projection section 2202 using air, and an exterior cabinet 1 for housing the projection section 2202 and the cooling section 2203. The projection section 2202 includes a light source-lamp unit 7, a mirror box 31, an emission optical unit 9, an imaging element unit 10, a projection lens unit 2201, a circuit unit 13, a power supply unit 14, and a light source lamp power supply unit 15. The cooling section 2203 includes a lamp cooling fan 19, a mirror cooling fan 20, a first cooling fan 16, a second cooling fan 17, and a third cooling fan 18.

The light source lamp unit 7 includes a light source lamp 5 and an oval reflection mirror 6. The projection lens unit 2201 includes a projection lens 12 and a lens moving device 11. The mirror box 31 includes a reflection mirror 8.

The exterior cabinet 1 has a front cabinet 21, a first side cabinet 22, a second side cabinet 23, a rear cabinet 24, an upper cabinet 25 and a lower cabinet 26. The front cabinet 21 has a first air intake 2, the first side cabinet 22 has a. second air intake 3, the second side cabinet 23 has a third air intake 27, and the upper cabinet 25 has an exhaust port 4. The rear cabinet 24 has a first exhaust port 28, a second exhaust port 29, and a third exhaust port 30.

The exterior cabinet 1 is formed of metal or resin, and has a six-faceted structure. The first intake 2 and the second intake 3 take in air, with which the cooling section 2203 cools down the projection section 2202, from outside the cabinet 1. The exhaust port 4 and the first to third exhaust ports 28 to 30 exhaust air which the cooling section 2203 has used for cooling, to the outside of the cabinet 1. As shown by arrows 2101 to 2105, the noise caused by the cooling section 2203 leaks to the outside of the cabinet 1, from the first air intake 2, the second air intake 3, the exhaust port 4, and the exhaust ports 28 to 30.

As the light source lamp 5, a xenon lamp or the like is used for a large output. The light emitted from the light source lamp 5 is reflected against the oval reflection mirror 6, and is optically reflected by the reflection mirror 8, thereby guided to the emission optical unit 9. The emission optical unit 9 is comprised of a condenser lens (not shown) and the like, for guiding light effectively to the imaging element unit 10. The imaging element unit 10 is a light valve for optically modulating image signals, and is a transmission type element such as liquid crystal or a reflection type element comprised of micro mirrors, etc., so as to generate optical picture information using light from the emission optical unit 9.

The optical picture information from the imaging element unit 10 is enlarged and projected through the projection lens 12. The projection lens 12 is capable of moving upward, downward, rightward, and leftward, by means of the lens moving device 11, for focus adjustments and angle of view adjustments.

The circuit unit 13 controls the imaging element unit 10. The power supply unit 14 drives the circuit unit 13 and the like. The light source lamp power supply unit 15 starts the light source lamp 5. The first cooling fan 16, the second cooling fan 17, and the third cooling fan 18 cool down the circuit unit 13, the power supply unit 14, and the light source lamp power supply unit 15, respectively.

The large-size lamp cooling fan 19 cools down the light source lamp 5. The mirror cooling fan 20 cools down the emission optical unit 9.

The first air intake 2 provided on the front cabinet 21, the second air intake 3 provided on the first side cabinet 22, and the third air intake 27 provided on the second side cabinet 23 take in exterior air as indicated by arrows 2204, 2205, and 2206. The first exhaust port 28 provided on the rear cabinet 24 exhausts air used for the cooling of the light source lamp power supply unit 15 as indicated by an arrow 2207. The second exhaust port 29 exhausts air used for the cooling of the light source lamp box 7 as indicated by an arrow 2208. The third exhaust port 30 exhausts air used for the cooling of the emission optical unit 9, from the mirror box 31 as indicated by an arrow 2209.

In order to obtain an image with a higher luminance, it is necessary to employ a light source lamp unit 7 and a light source lamp power supply unit 15 having a greater output. With such a structure, the quantity of the generated heat increases as the output increases, and therefore it is necessary to employ a large cooling fan so as to improve the cooling performance. Using a large cooling fan, however, results in a problem of increasing the cooling noise.

Furthermore, the use of projection-type imaging apparatuses is not only for presentations in conference rooms and the like but also includes viewing of images in halls, and therefore the market expects viewing of high quality images in quieter environments. With the structure described with reference to FIGS. 21 and 22, in which the air intakes 2, 3, and 27 are provided on the cabinet 1 so as to take in air, the noise of the cooling fans 16, 17, 18, 19, and 20 cutting the air is naturally radiated from the air intakes 2, 3, and 27, which results in a problem of increasing the noise from the imaging apparatus 2100.

In addition, the light emitted from the light source lamp 5 leaks outside the cabinet 1 from the air intakes 2, 3, and 27. This particularly poses a problem of not being able to obtain a high quality image when the image is projected in a dark environment such as in a movie theater, since the leaked light illuminates places other than the screen, which leads to not only worsening of the image viewing atmosphere but also deterioration of the image quality.

One object of the present invention is to provide an imaging apparatus which is capable of controlling emission of the noise caused by the cooling section so as to suppress the noise leaving the device, even in the case where a large cooling section is used for cooling a projection section with a high output needed for obtaining by images with higher luminance.

Another object of the present invention is to provide an imaging apparatus which is capable of preventing light emitted from the light source lamp unit from illuminating places other than the screen.

DISCLOSURE OF THE INVENTION

According to one aspect of the invention, an imaging apparatus includes: a projection section for projecting an image onto a screen; a cooling section for cooling the projection section by means of air; an exterior cabinet for housing the projection section and the cooling section; and an exhaust section for exhausting air used for the cooling of the projection section by the cooling section, from the exterior cabinet wherein the exhaust section has a function for attenuating a noise caused by the cooling section.

The exhaust section may include an exhaust duct having a ventilation path for guiding the noise and air from the projection section to the exterior of the exterior cabinet; and the ventilation path is formed so that the noise strikes an interior surface of the ventilation path and changes its direction of movement.

The ventilation path may be formed so that the moving path of the noise contains at least one L shape.

The exhaust duct may include a sound absorption material which is provided on the interior surf ace of the ventilation path for absorbing the noise.

The exterior cabinet may have a rear face which is formed on a side opposite to the screen; the exhaust duct may be provided on the location corresponding to the rear face; and the exhaust duct may exhaust air in a direction which is opposite to the direction in which the projection section projects the image onto the screen.

The exhaust duct may exhaust the air in a direction which is substantially the same as the direction in which the projection section projects the image onto the screen.

The exhaust duct may include at least one active muffling device provided in the ventilation path.

The projection section may include a light source lamp unit, an emission optical unit for collecting light from the light source lamp unit, an imaging element unit for generating optical picture information using light collected by the emission optical unit, and a projection lens unit for enlarging and projecting the optical picture information; and the cooling section may include a lamp cooling fan for cooling the light source lamp cooling unit, and a mirror cooling fan for cooling the emission optical unit.

The projection section may further include a circuit unit for controlling the imaging element unit, a power supply unit for driving the circuit unit; and a light source lamp power supply unit for driving the light source lamp unit; and the cooling section may further include a first cooling fan for cooling the circuit unit, a second cooling fan for cooling the power supply unit, and a third cooling fan for cooling the light source lamp power supply unit.

The cooling section may include a cooling fan.

The imaging apparatus may further include an air v intake section for taking in air from outside the exterior cabinet and providing air to the cooling section.

The air intake section may include an air intake duct for guiding air from the exterior of the exterior cabinet to the cooling section and for guiding the noise from the projection section to the exterior of the exterior cabinet; and the ventilation path may be formed so that the noise strikes an interior surface of the ventilation path and changes its direction of movement.

The ventilation path may be formed so that the moving path of the noise has at least one L shape.

The air intake duct may include a sound absorption material which is provided on the interior surface of the ventilation path for absorbing the noise.

The air intake duct may be provided at a position corresponding to the lower face of the exterior cabinet.

The air intake duct may include at least one active muffling device provided in the ventilation path.

The exterior cabinet may include a sound absorption material which is provided on at least one of interior surfaces of the exterior cabinet for absorbing the noise.

The projection section may include a light source lamp unit, an emission optical unit for collecting light from the light source lamp unit, an imaging element unit for generating optical picture information using light collected by the emission optical unit, and a projection lens unit for enlarging and projecting the optical picture information; the projection lens unit may include a projection lens and a projection lens moving device for moving the projection lens; and the exterior cabinet may have a front face which is formed at the side of the screen, the exterior cabinet further including a dust-proofing section which is provided between the front face and the projection lens moving device, for preventing outside dust from entering the apparatus; wherein the dust-proofing section includes at least two pieces of cloth, and a sound absorbing material inserted between the two pieces of cloth.

The imaging apparatus may be a projection-type imaging apparatus.

The imaging apparatus may be a liquid crystal projector.

The imaging apparatus may be a rear-projection television.

BRIEF DESCRIPTION OF THE DRAWINGS

FIG. 15 is a diagram illustrating the noise level values of the projection-type imaging apparatuses according to Examples 1 to 4;

BEST MODE FOR CARRYING OUT THE INVENTION

EXAMPLE 1

Figure 1:
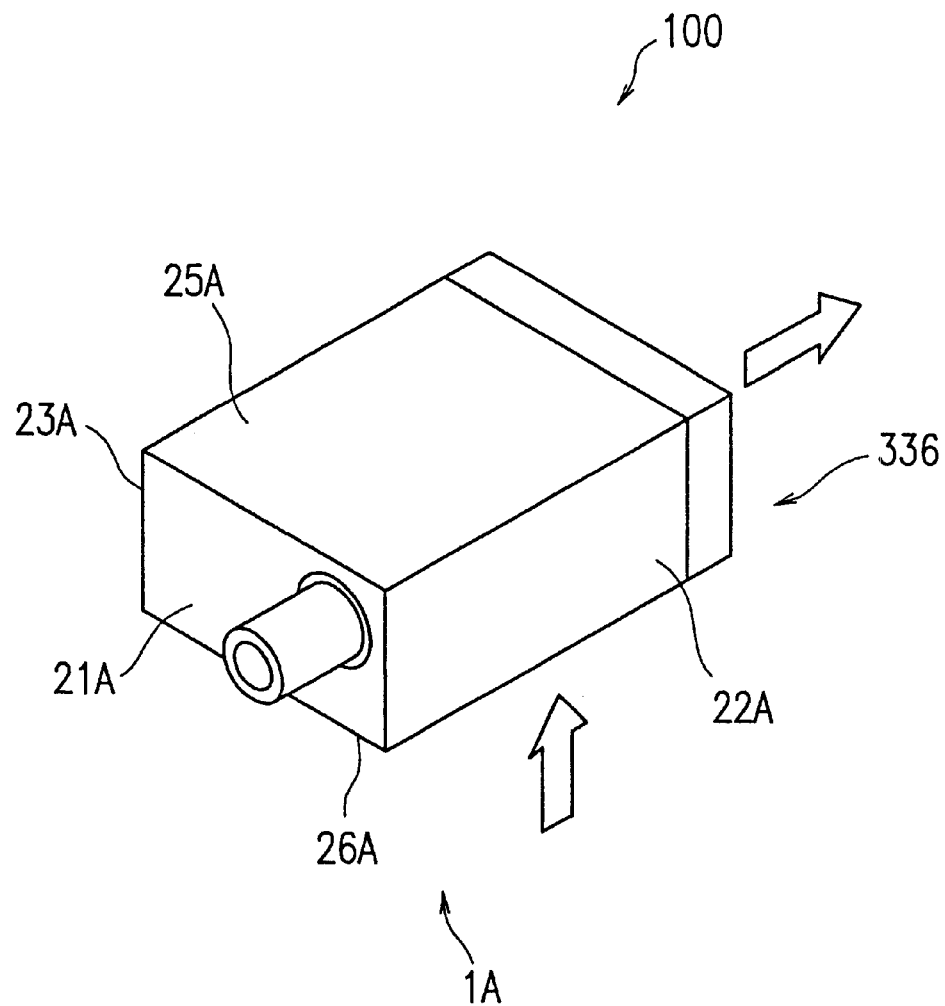
FIG. 1 is a profile view of a projection-type imaging apparatus according to Example 1.
Figure 2:
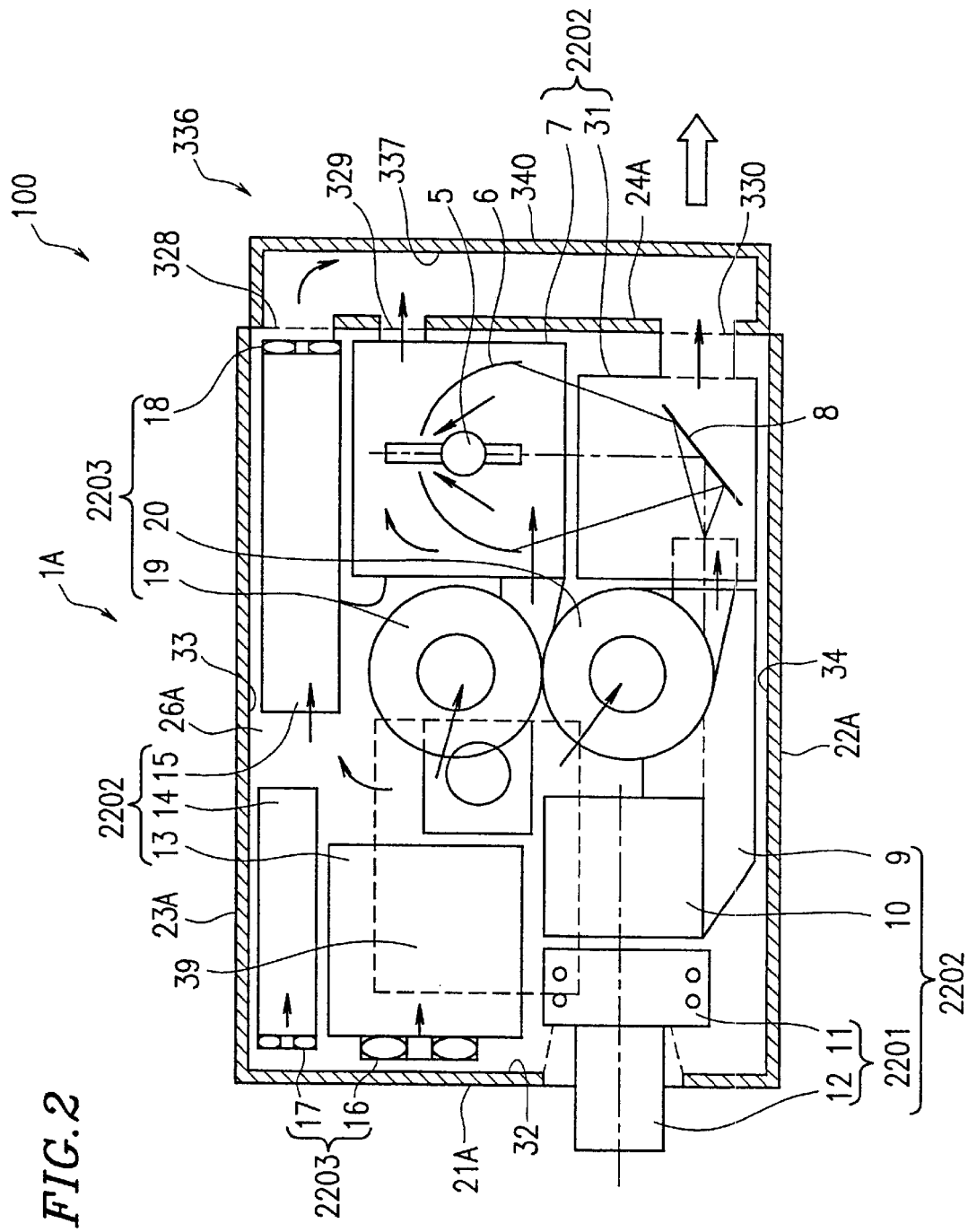
FIG. 2 is a cross-sectional plan view of the projection-type imaging apparatus according to Example 1.
Figure 3:
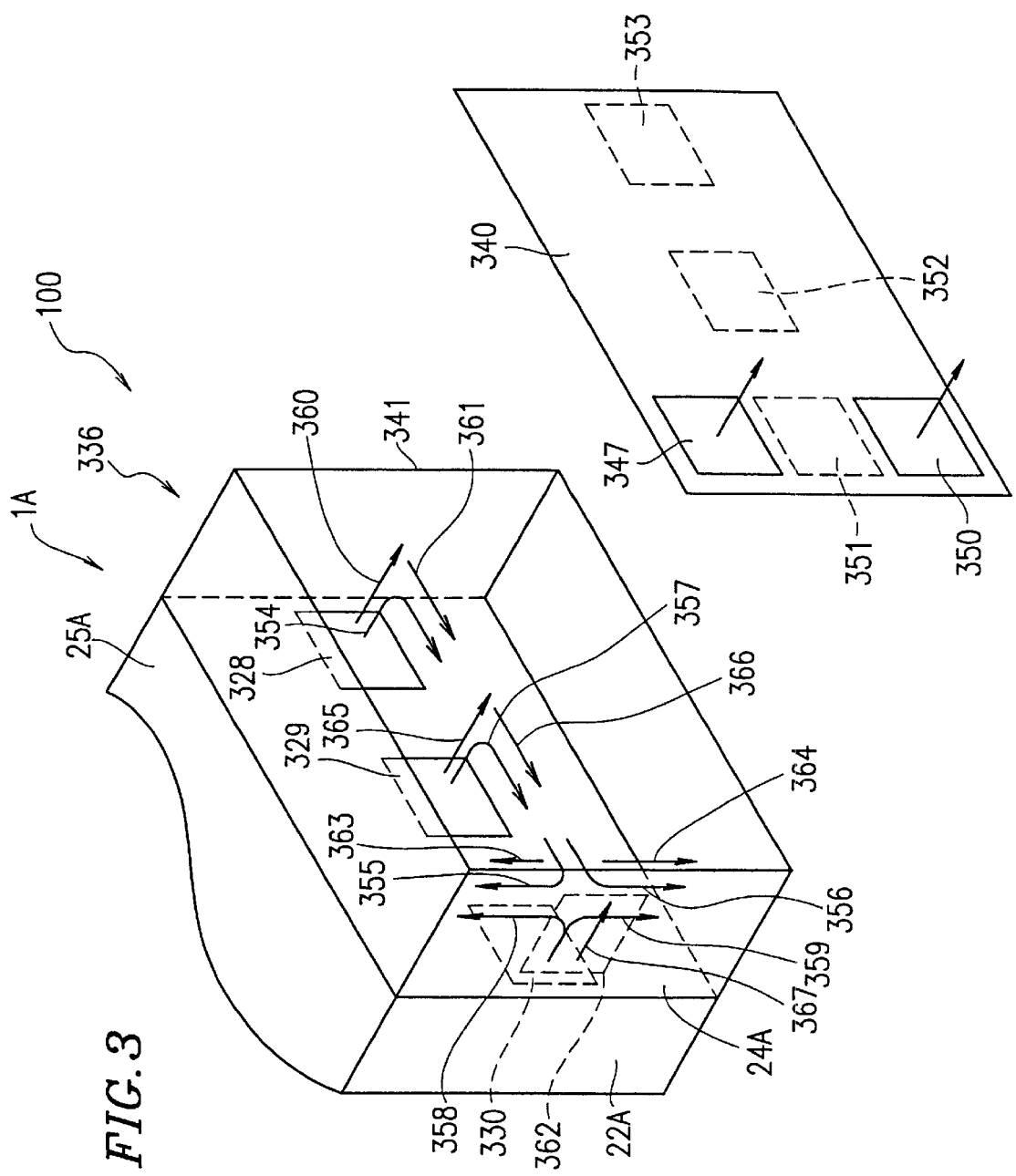
FIG. 3 is a diagram illustrating an exhaust duct of the projection-type imaging apparatus according to Example 1.
Figure 4:
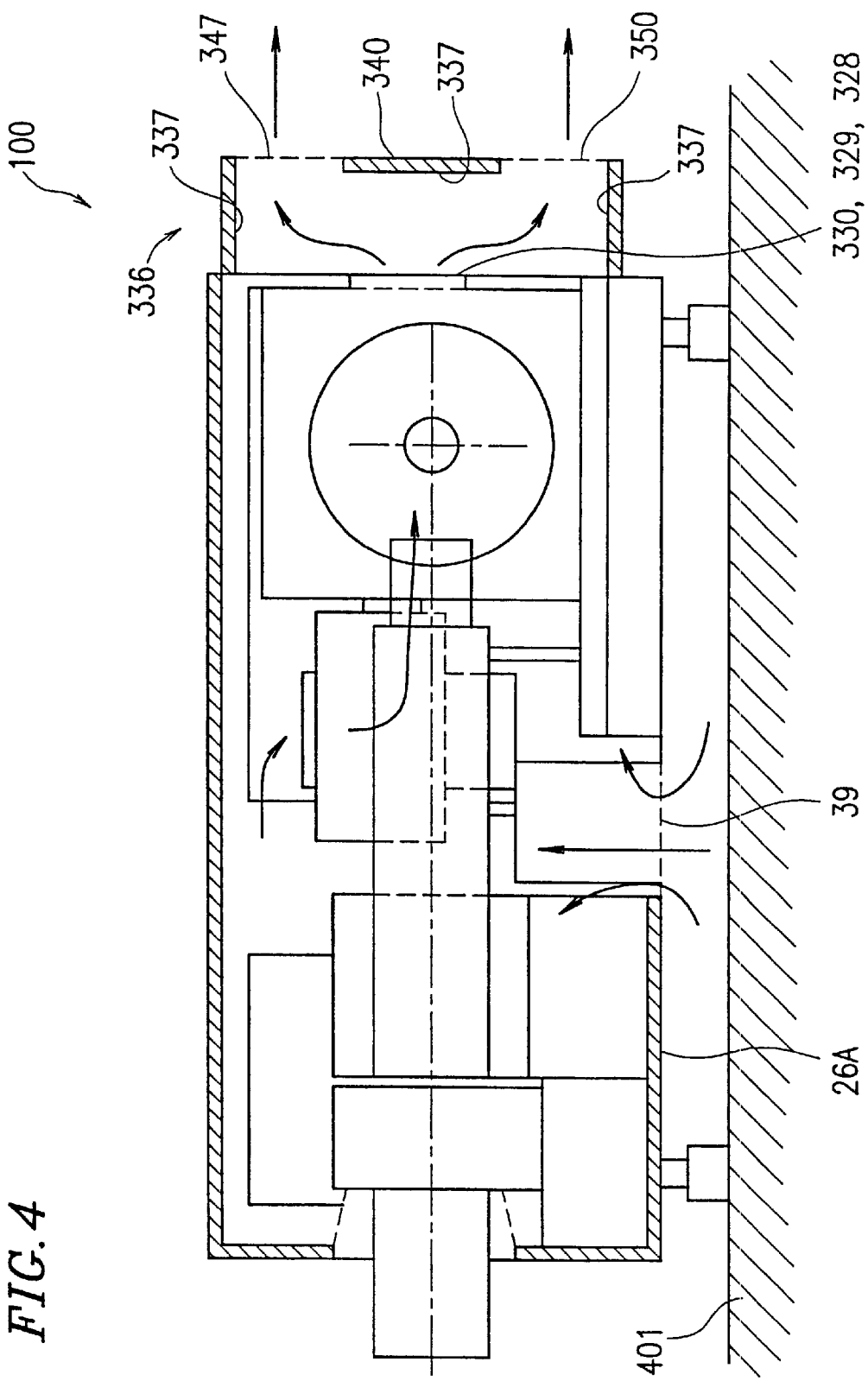
FIG. 4 is a cross-sectional side view of the projection-type imaging apparatus according to Example 1.

A projection-type imaging apparatus according to Example 1 will be described with reference to FIGS. 1 to 4. FIG. 1 is a profile view of the projection-type imaging apparatus 100 according to Example 1, FIG. 2 is. a cross-sectional plan view of the imaging apparatus 100, FIG. 3 is a diagram illustrating an exhaust duct 336 of the imaging apparatus 100, and FIG. 4 is a cross-sectional side view of the imaging apparatus 100. Components similar to those of the imaging apparatus 2100 described with reference to FIGS. 21 and 22 will be denoted by the same reference numerals, and detailed explanation thereof will be omitted.

The projection-type imaging apparatus 100 includes a projection section 2202 for projecting an image onto a screen, a cooling section 2203 for cooling the projection section 2203 by means of air, and an exterior cabinet 1A for housing the projection-section 2202 and the cooling section 2203.

The projection section 2202 includes a light source lamp unit 7, a mirror box 31, an emission optical unit 9, an imaging element unit 10, a projection lens unit 2201, a circuit unit 13, a power supply unit 14, and a light source lamp power supply unit 15. The cooling section 2203 includes a lamp cooling fan 19, a mirror cooling fan 20, a first cooling fan 16, a second cooling fan 17 and a third cooling fan 18.

The light source lamp unit 7 includes a light source lamp 5 and an oval reflection mirror 6. The projection lens unit 2201 includes a projection lens 12 and a lens moving device 11. The mirror box 31 includes a reflection mirror 8.

The light emitted from the light source lamp 5 is reflected against the oval reflection mirror 6, and is optically reflected by the reflection mirror 8, thereby being guided to the emission optical unit 9. The emission optical unit 9 is comprised of a condenser lens (not shown) and the like, for guiding light effectively to the imaging element unit 10. The imaging element unit 10 is a light valve for optically modulating image signals, which is a transmission type elements such as liquid crystals or a reflection type element comprised of micro mirrors, etc., so as to generate optical picture information using light from the emission optical unit 9.

The optical picture information from the imaging element unit 10 is enlarged and projected through the projection lens 12. The projection lens 12 is capable of moving upward, downward, rightward, and leftward, by means of the lens moving device 11, for focus adjustments and angle of view adjustments.

The circuit unit 13 controls the imaging element unit 10. The power supply unit 14 drives the circuit unit 13 and the like. The light source lamp power supply unit 15 starts the light source lamp 5. The first cooling fan 16, the second cooling fan 17, and the third cooling fan 18 cool down the circuit unit 13, the power supply unit 14, and the light source lamp power supply unit 15, respectively.

The large-size lamp cooling fan 19 cools down the light source lamp 5. The mirror cooling fan 20 cools down the emission optical unit 9.

The exterior cabinet 1A has a front cabinet 21A, a first side cabinet 22A, a second side cabinet 23A, a rear cabinet 24A, an upper cabinet 25A and a lower cabinet 26A. The lower cabinet 26A has an air intake 39.

Figure 21:
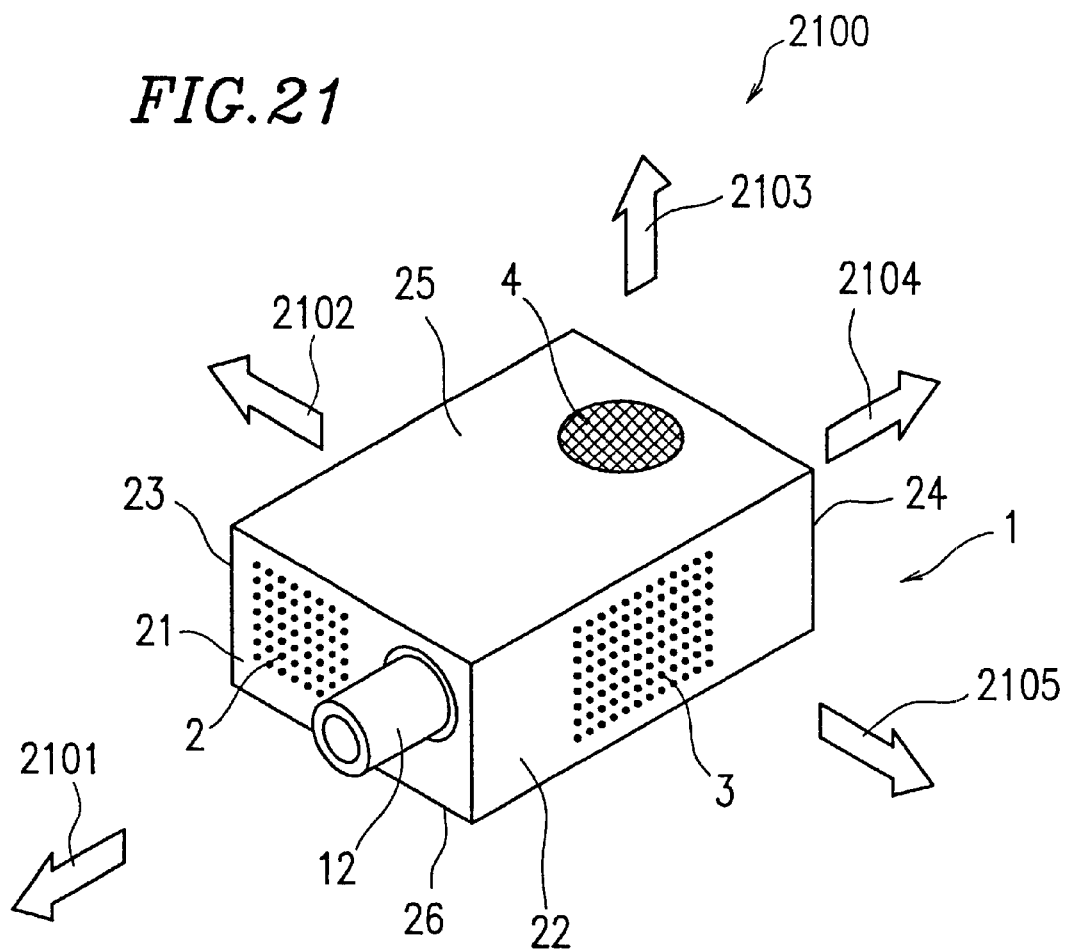
FIG. 21 is a profile view of a conventional imaging apparatus.
Figure 22:
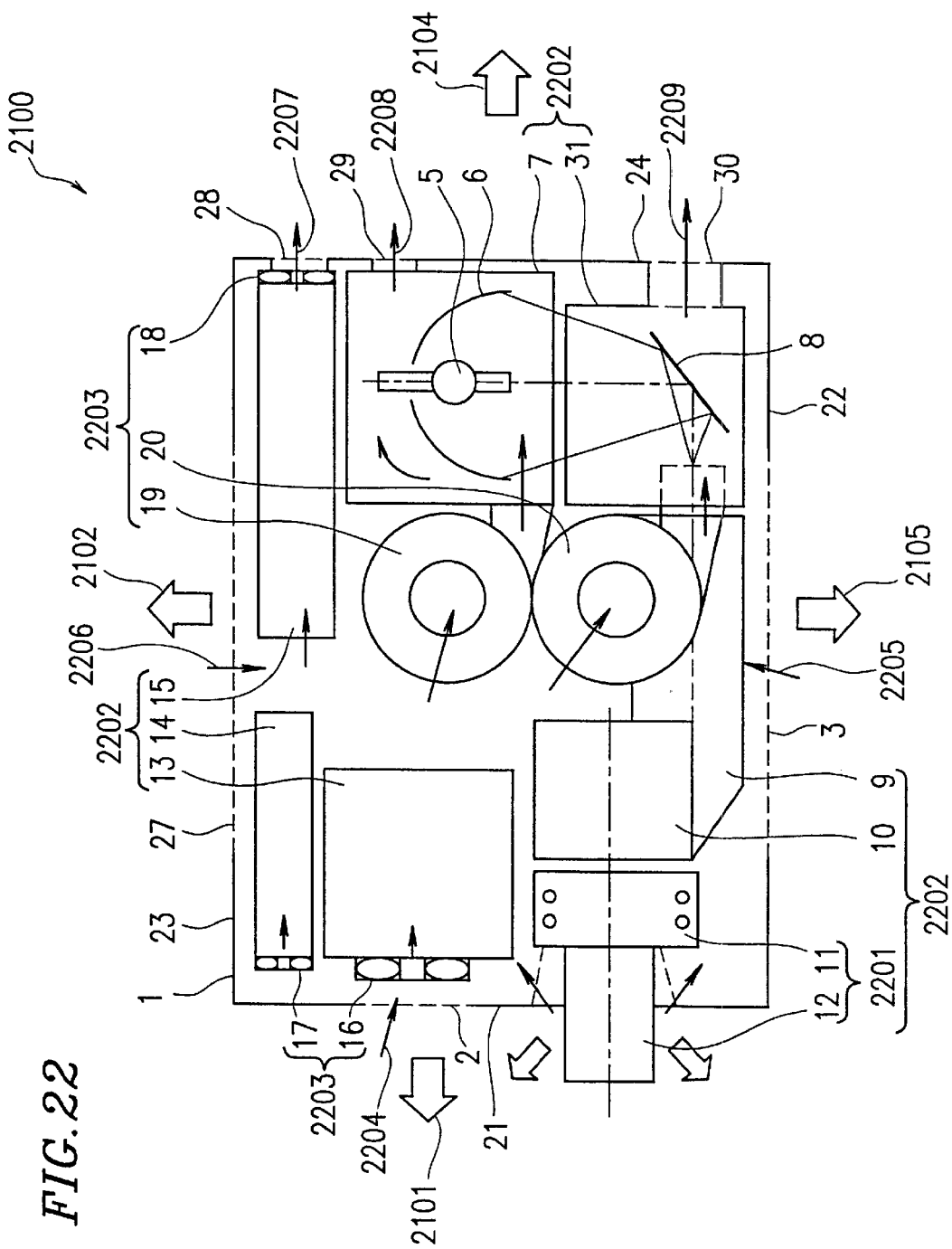
FIG. 22 is a cross-sectional plan view of a conventional imaging apparatus.

The difference from the conventional imaging apparatus illustrated in FIG. 21 is that no air intake is provided on cabinets other than the lower cabinet 26A. Furthermore, a porous first sound absorbing material 32, second sound absorbing material 33, third sound absorbing material 34, and fourth sound absorbing material (not shown) may be adhered by an adhesive or the like on interior sides of the front cabinet 21A, the first side cabinet 22A, the second side cabinet 23A, and the upper cabinet 25A (FIG. 1). Naturally, portions where the cabinets are fitted together are coupled so as not to leak sounds.

The porous sound absorbing material may be, for example, rubber foaming material (product code: EE710) with a thickness of 5 to 10 mm of EPDM (ethylene, propylene, diene, and methylene gauge) material manufactured by Nitto Denko Corporation.

The imaging apparatus 100 further includes an exhaust duct 336 for exhausting air used by the cooling section 2203 for cooling the projection section 2202, from the exterior cabinet 1A. The exhaust duct 336 is provided on the side of the rear cabinet 24A. The rear cabinet 24A has a first exhaust port 328, a second exhaust port 329, and a third exhaust port 330. The exhaust duct 336 includes a main body 341, and a behind-the-duct cabinet 340. The main body 341 is covered by the behind-the-duct cabinet 340 so as to have a box-like shape. The behind-the-duct cabinet 340 has exhaust ports 347 and 350.

The exhaustion from the first cooling fan 16, the second cooling fan 17, and the third cooling fan 18 (FIG. 2) proceeds from the first exhaust port 328 as indicated by an arrow 354, and then advances as indicated by an arrow 355 or 356 so as to be exhausted from the exhaust port 347 or 350. The noise caused by the first cooling fan 16, the second cooling-fan 17, and the third cooling fan 18 proceeds from the first exhaust port 328 as indicated by an arrow 360, and strikes the interior face 353 of the behind-the-duct cabinet 340, thereby being attenuated, and then changes its direction of movement to the direction indicated by an arrow 361. The noise then strikes the interior face 362, thereby being further attenuated, and then changes its direction of movement as indicated by an arrow 363 or 364, so as to leak outside the exhaust duct 336 from the exhaust port 347 or 350.

Similarly, the exhaustion from the lamp cooling fan 19 (FIG. 2) proceeds from the second exhaust port 329 as indicated by an arrow 357 as illustrated in FIG. 3, and then advances as indicated by an arrow 355 or 356 so as to be exhausted from the exhaust port 347 or 350. The noise caused by the lamp cooling fan 19 proceeds from the second exhaust port 329 as indicated by an arrow 365, and strikes the interior face 352, thereby being attenuated, and then changes its direction of movement and advances as indicated by an arrow 366. The noise then strikes the interior face 362, thereby being further attenuated, and changes its direction of movement and advances as indicated by an arrow 363 or 364 so as to leak outside the exhaust duct 336 from the exhaust port 347 or 350.

Similarly, the exhaustion from the mirror cooling fan 20 (FIG. 2) proceeds from the third exhaust port 330 as indicated by an arrow. 358 or 359 as illustrated in FIG. 3, and then is exhausted from the exhaust port 347 or 350. The noise caused by the mirror cooling fan 20 proceeds as indicated by an arrow 367, and strikes the interior face 351, thereby being attenuated, and then changes its direction of movement as indicated by an arrow 363 or 364, so as to leak outside the exhaust duct 336 from the exhaust port 347 or 350.

As described above, the exhaust duct 336 has a ventilation path for guiding the noise and the exhaustion from the first cooling fan 16, the second cooling fan 17, the third cooling fan 18, the lamp cooling fan 19, and the mirror cooling fan 20, to outside the imaging apparatus 100. The ventilation path is formed so that the path contains at least one L shape, whereby the noise strikes the interior walls 353, 352, 351, 362 of the ventilation path, thereby being attenuated, and changes its direction of movement. Therefore, the noise exits from the imaging apparatus 100 to outside after being attenuated. This suppresses the radiation of the noise caused by the cooling section 2203. As illustrated in FIG. 2, a porous duct sound absorbing material 337 may be adhered by an adhesive or the like. The material for the porous duct sound absorbing material 337 is similar to that for the aforementioned porous sound absorbing material (the first sound absorbing material 32, the second sound absorbing material 33, the third sound absorbing material 34, and the fourth sound absorbing material). By using porous sound absorbing material and duct sound absorbing material, the radiation of the noise caused by the cooling section 2203 to outside is further suppressed.

As illustrated in FIG. 2, an air intake 39 is provided on the lower cabinet 26A so as to be able to lead fresh air into the imaging apparatus 100.

External air led through the air intake 39 provided on the lower cabinet 26A is used by the first cooling fan 16, the second cooling fan 17, the third cooling fan 18 for cooling the circuit unit 13, the power supply unit 14 and the light source power supply unit 15, respectively, and then flows from the first exhaust port 328 to the exhaust duct 336.

The air led through the air intake 39 also flows to the light source lamp box 7 by action of the cooling fan 19. The air, after cooling down the light source lamp 5 and the oval reflection mirror 6, flows to the exhaust duct 336 from the second exhaust port 329.

The air led through the air intake 39 is also used by the mirror cooling fan 20 for cooling the emission optical unit 9. The air then flows to the mirror box 31 for cooling the reflection mirror 8 and flows from the third exhaust port 330 to the exhaust duct 336.

According to the imaging apparatus 100, the lower cabinet 26A is provided with only one air intake 39 as an opening for taking in the air. As openings for exhaustion, only the exhaust ports 347, 350 are formed, which are provided on the exhaust duct 336. The radiation of the internal noise occurs mainly through openings, and therefore according to the imaging apparatus 100, which has fewer openings than a conventional apparatus, the quantity of the radiation of the internal noise to outside the apparatus is markedly reduced in comparison with the conventional apparatus.

As illustrated in FIG. 4, the air intake 39 is formed on the lower cabinet 26A. The imaging apparatus 100 is usually placed on the floor 401. The radiating sound from the air intake 39, which is due to the noise of the cooling section 2203, does not directly leak outside the apparatus but becomes radiating sound after it has reflected against the floor. Therefore, the noise to the outside can be reduced.

EXAMPLE 2

Figure 5:
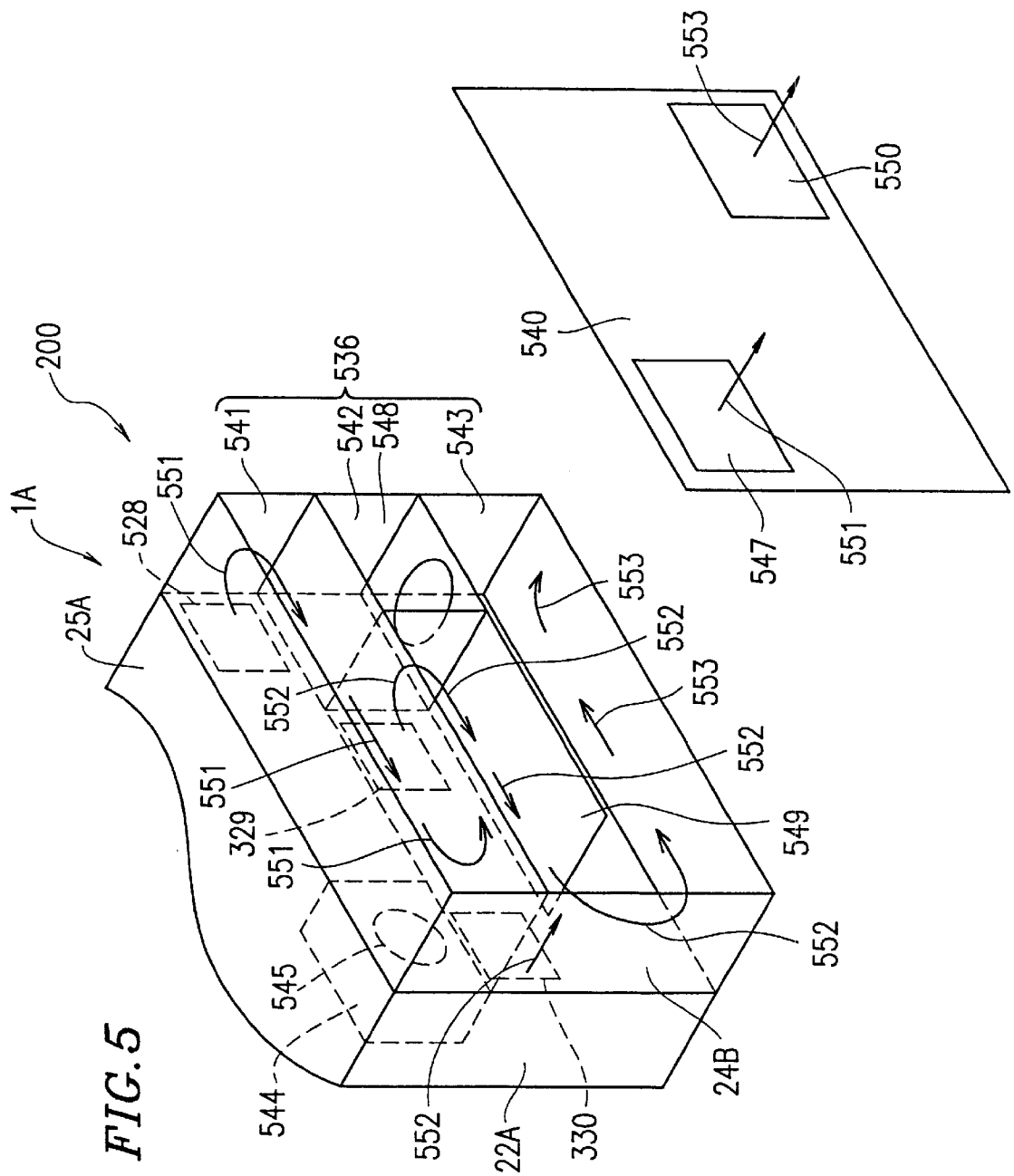
FIG. 5 is a diagram illustrating an exhaust duct of the projection-type imaging apparatus according to Example 2.
Figure 6:
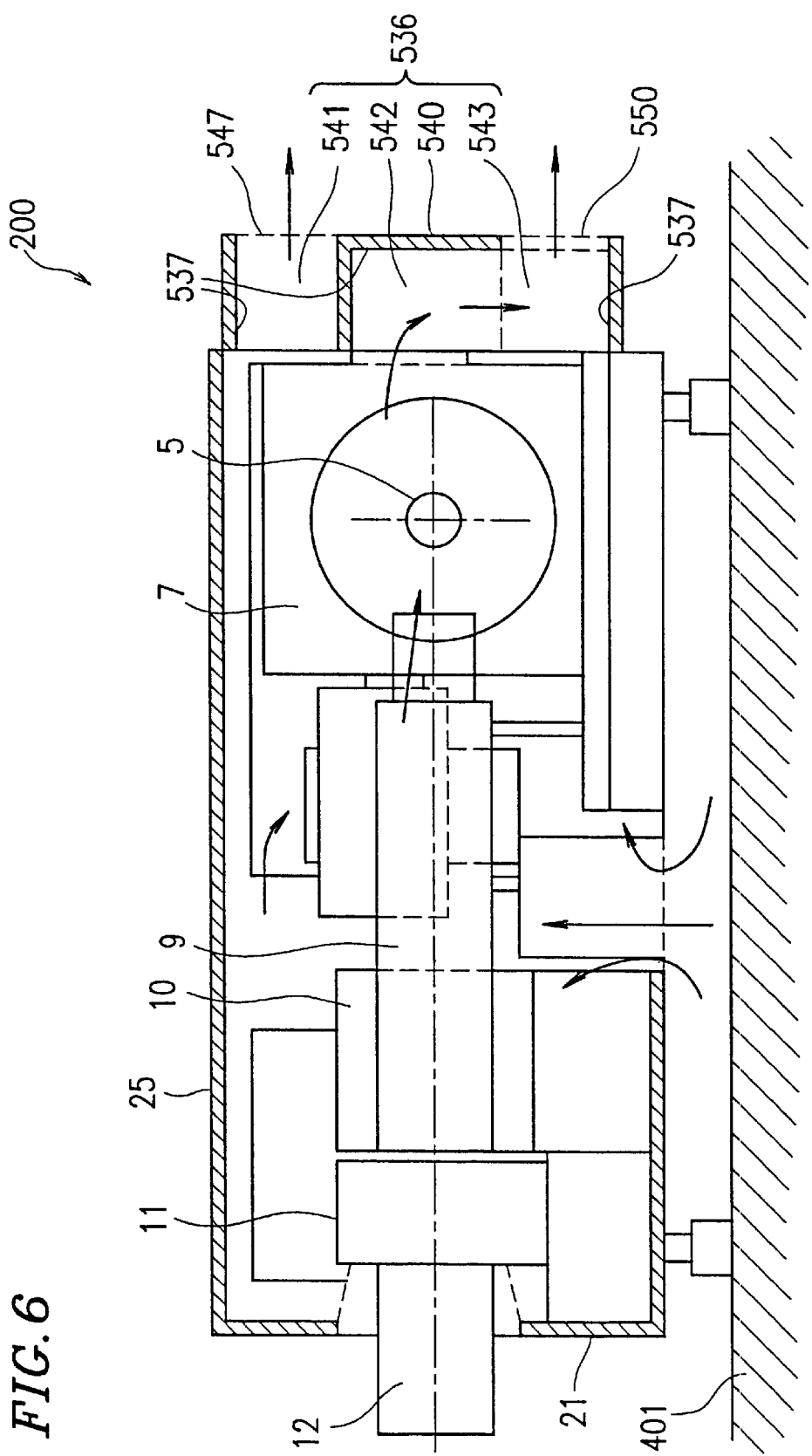
FIG. 6 is a cross-sectional side view of the projection-type imaging apparatus according to Example 2.

A projection-type imaging apparatus 200 will be described with reference to FIGS. 5 to 10. FIG. 5 is a diagram illustrating an exhaust duct of the projection-type imaging apparatus 200. FIG. 6 is a cross-sectional side view of the projection-type imaging apparatus 200. Components similar to those of the imaging apparatus 100 will be denoted by the same reference numerals, and detailed explanation thereof will be omitted.

With reference to FIGS. 5 and 6, the imaging apparatus 200 according to Example 2 is different from the imaging apparatus 100 according to Example 1 in that the imaging apparatus 200 has an exhaust duct 536 having a three-stage structure instead of the exhaust duct 336.

The exhaust duct 536 includes an upper exhaust duct 541, a middle exhaust duct 542, a lower exhaust duct 543, and a behind-the-duct cabinet 540. The exhaust duct 536 is formed so as to be covered by the behind-the-duct cabinet 540. The exhaust duct 536 is provided on the side of a rear cabinet 24B. The rear cabinet 24B has a first exhaust port 528, a second exhaust port 329, and a third exhaust port 330. The first exhaust port 528 corresponds to the upper exhaust duct 541. Furthermore, a first speaker box 544 is placed on the other side, and a speaker 546A (described later with reference to FIG. 7) is placed in a speaker installation hole 545.

The exhaustion of air from the first exhaust port 528 is exhausted from the upper exhaust port 547 provided on the behind-the-duct cabinet 540 as indicated by an arrow 551.

A second speaker box 548 is placed on the middle stage exhaust duct 542, which is separated from the lower exhaust duct 543 by a partition board 549. It is possible to guide the exhaustions of air from the light source lamp box 7 and the mirror box 31 through the second exhaust port 329 and the third exhaust port 330.

These exhaustions of air merge together inside the middle exhaust duct 542 as indicated by an arrow 552, and then flow into the lower exhaust duct 543 since the partition board 549 is only formed partway. The air flown to the lower exhaust duct 543 is exhausted outside from the lower exhaust port 550 as indicated by an arrow 553. Similar to the exhaust duct 336 described in Example 1, the exhaust duct 543 has at least one L shape. The direct noise form the first exhaust port 528, the second exhaust port 329 and the third exhaust port 330 strikes the behind-the-duct cabinet 540, and because of the absorption by the duct sound absorbing material and the attenuation inside the exhaust duct 536, the exhausted noise from the exhaust port 547 and the exhausted port 550 is significantly reduced in comparison with the conventional apparatus.

Figure 7:
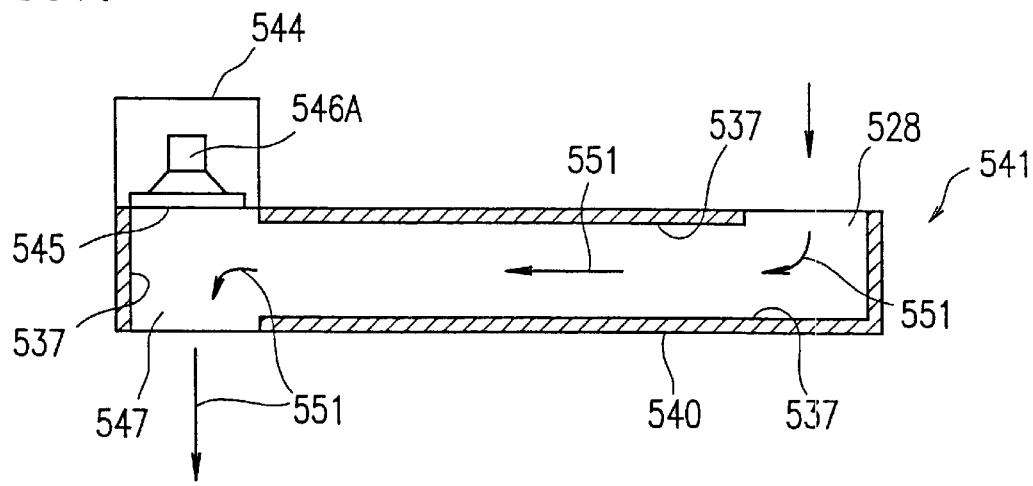
FIG. 7 is a cross-sectional view of the exhaust duct of the projection-type imaging apparatus according to Example 2.
Figure 8:
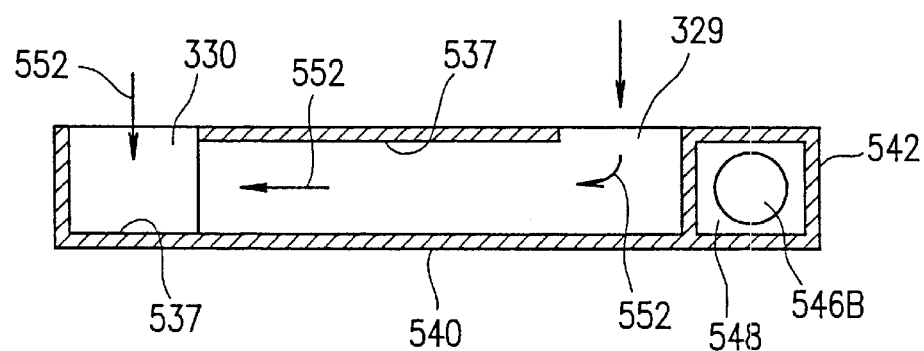
FIG. 8 is another cross-sectional view of the exhaust duct of the projection-type imaging apparatus according to Example 2.
Figure 9:
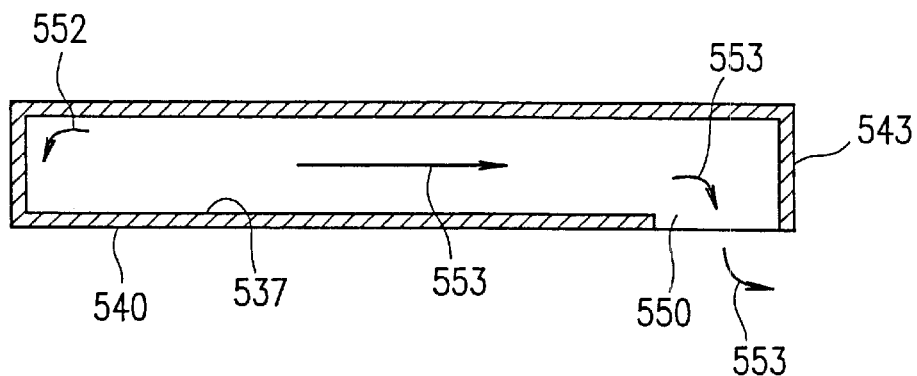
FIG. 9 is still another cross-sectional view of the exhaust duct of the projection-type imaging apparatus according to Example 2.

FIG. 7 illustrates a cross-sectional view of the upper stage exhaust duct 541 seen from the above, FIG. 8 illustrates a cross-sectional view of the middle stage exhaust duct 542 seen from the above, and FIG. 9 illustrates a cross-sectional view of the lower exhaust duct 543 seen from the above. Arrows 551, 552, and 553 indicate ventilation paths.

In addition, a porous duct sound absorbing material 537 is adhered inside the upper stage exhaust duct 541, the middle stage exhaust duct 542, and the lower stage exhaust duct 543 by an adhesive or the like, so as to increase sound absorbing effect.

Figure 10:
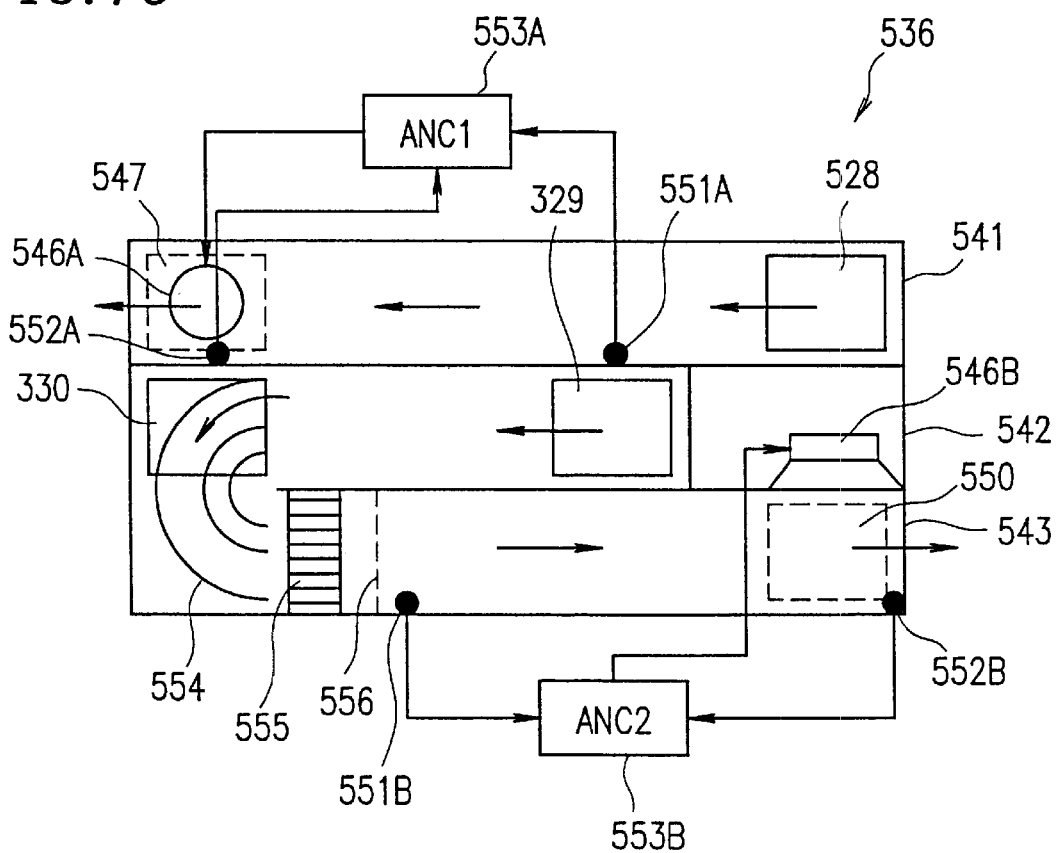
FIG. 10 is a diagram illustrating an active muffling device of the projection-type imaging apparatus according to Example 2.

FIG. 10 illustrates a structure in which the speaker 546A is used in order to actively muffle the noise inside the exhaust duct 536.

As illustrated in FIG. 10, the exhaust duct 536 further includes a noise detection microphone 551A provided in the vicinity of the first exhaust port 528 of the upper exhaust duct 541 for detecting the ventilation noise, an error detection microphone 552A provided in the vicinity of the upper exhaust port 547 for detecting the noise at the upper exhaust port 547, a speaker 546A provided in the vicinity of the error detection microphone 552A, for generating a sound which has a sound pressure substantially the same as and the phase opposite to those of the noise in the duct detected by the error detection microphone 552A, and an ANC computation circuit 553A for performing computations based on signals from the noise detection microphone 551A and the error detection microphone 552A. so as to make the signal from the error detection microphone 552A smaller, and outputting control signals to speaker 546A.

The middle stage exhaust duct 542 and the lower stage exhaust duct 543 also include a noise detection microphone 551B, an error detection microphone 552B an ANC computation circuit 553B, and a speaker 546B, which have a similar structure and function. This principle is generally called ANC (Active Noise Control) technique, and this structure not only provides a sound absorbing effects inside the exhaust duct 536 but also detects the interior noise of the exhaust duct 536 and outputs from the speaker 546A and 546B a sound which has the phase opposite to that of the detected noise at the exhaust region, thereby making it possible a further increase of the reduction of the exhaust noise from the exhaust duct 536.

In FIG. 10, it is also effective to have a structure in which a plate-like flow smoother 554, which changes the ventilation condition from a turbulent condition to a smoothed condition, is provided so as to bridge the middle stage exhaust duct 542 and the lower stage exhaust duct 543, and a grille-like flow smoother 555 and a mesh-like flow smoother 556 are provided in the lower stage exhaust duct 543. As illustrated in FIG. 10, it is appropriate that the plate-like flow smoother 554 is formed with a plurality of C-shaped thin plates of 1 mm or less and is placed at the location where the direction of the ventilation path is changed by 180°. The grille-like flow smoother 555 is, for example, an object formed of an extremely thin aluminum with a honeycomb-shape cross section. An ordinary wire netting is effective enough for the mesh-like flow smoother 556.

EXAMPLE 3

Figure 11:
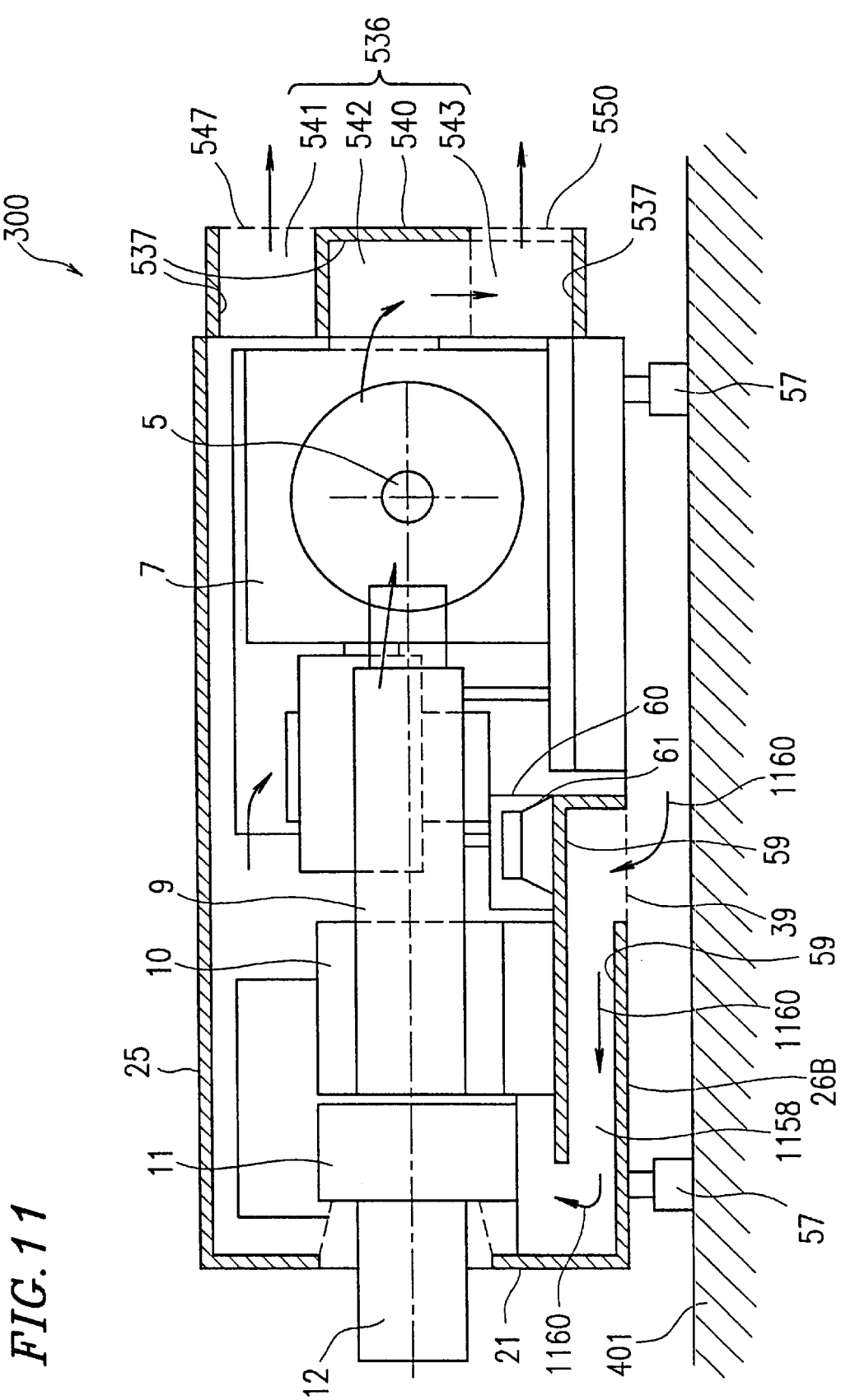
FIG. 11 is a cross-sectional side view of the projection-type imaging apparatus according to Example 3.

FIG. 11 is a cross-sectional side view of an imaging apparatus 300 according to Example 3. The imaging apparatus 300 is similar to the imaging apparatus 200 of Example 2 in FIG. 6 in terms of the basic structure.

Components similar to those of the imaging apparatus 200 will be denoted by the same reference numerals, and detailed explanation thereof will be omitted. The imaging apparatus 300 is different from the imaging apparatus 200 according to Example 2 in terms that the imaging apparatus 300 includes an air intake duct 1158. The air intake duct 1158 guides the air from the air intake 39 which is formed on the lower cabinet 26B to the inside of the imaging apparatus 300, as designated by an arrow 1160.

Figure 12:
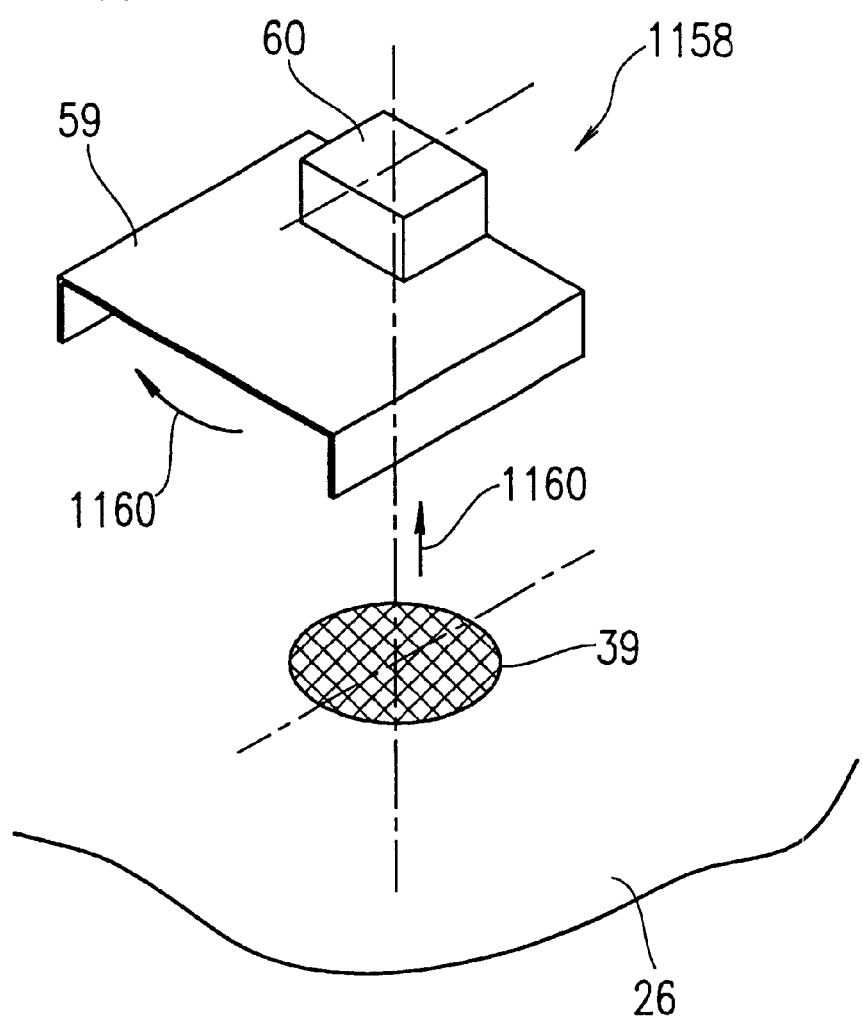
FIG. 12 is a profile view of the air intake duct of the projection-type imaging apparatus according to Example 3.

Similar to the exhaust duct 536, a sound absorbing material 59 may be adhered inside the air intake duct 1158 so as to increase the sound absorbing effect. FIG. 12 is a profile view of the air intake duct 1158, in which an arrow 1160 indicates the ventilation path during the air inhalation. By adopting such a structure, the noise caused by the cooling section inside the imaging apparatus 300 is not directly radiated to the outside from the air intake 39. Similar to the exhaust ducts 336, 536 in Examples 1 and 2, the air intake duct 1158 has an L shape structure, and therefore the noise strikes an interior wall of the air intake duct 1158 and is attenuated. This reduces the quantity of radiating noise from the air intake 39 to the outside of the apparatus.

Furthermore, similar to Example 2, it is possible to attach an active muffling device, which is described in detail with reference to FIG. 10. By placing an error detection microphone (not shown), a speaker box 60 and a speaker 61 on the air intake side of the air intake duct 1158, and by placing a noise detection microphone and an ANC computation circuit (not shown) on the air flow side of the air intake duct 1158, i.e., on the inner side of the apparatus, a further reduction of the noise for an imaging apparatus is possible since the quantity of noise radiation from the air intake 39 is reduced.

EXAMPLE 4

Figure 13:
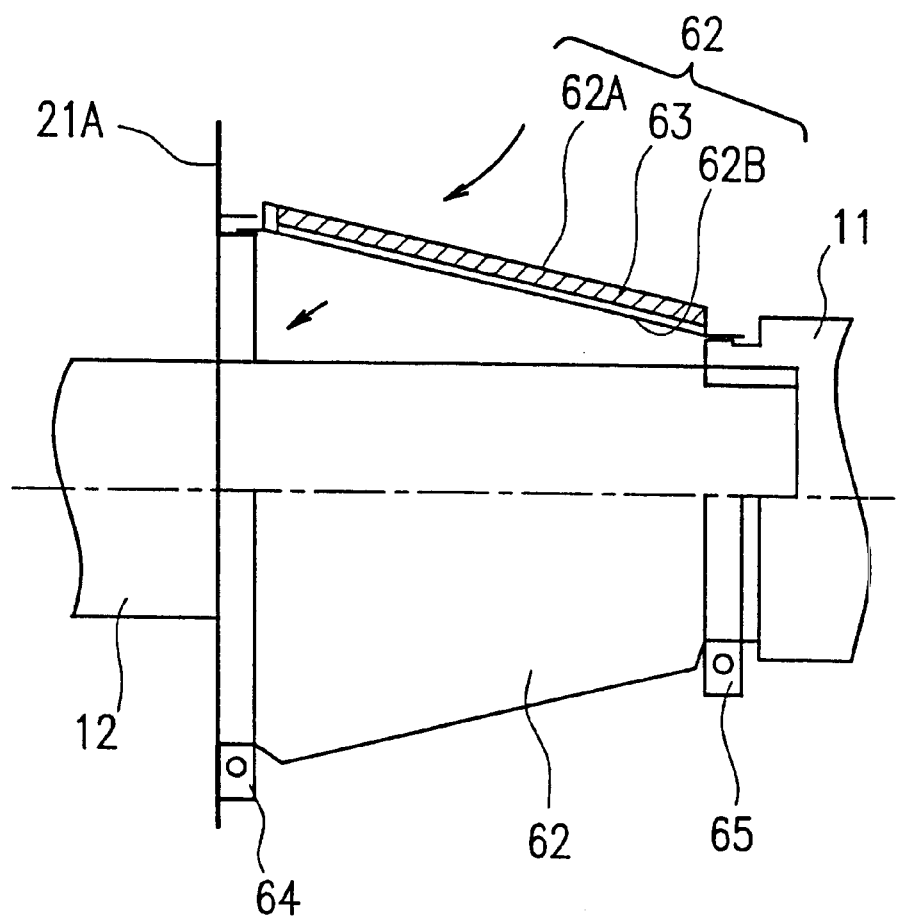
FIG. 13 is a diagram illustrating a dust-proofing cloth of a projection-type imaging apparatus according to Example 4.

FIG. 13 illustrates Example 4 of the present application. It is common that the lens moving device 11 has a structure capable of triaxial motion, i.e., forward-backward, upward-downward, and rightward-leftward, so as to perform the focus adjustments and angle of view adjustments. This requires that the front cabinet 21 should be composed to have an opening larger than the diameter of the projection lens. An imaging apparatus is an apparatus requiring an optical accuracy, and leaving a large opening may result in the dust in the air sticking to the imaging element unit 10, and decreasing the quality of the pictures.

The countermeasure against dust is generally provided by connecting the front cabinet 21A and the lens moving device 11 with an elastic cylindrical cloth. Although cloth has air permeability and is effective for the countermeasure against the dust, it has a disadvantage that the inside noise is radiated to the outside through the cloth, which results in increasing the noise of the imaging apparatus.

The dust-proofing cloth 62 illustrated in FIG. 13 has a double layered structure. Furthermore, it has a structure in which a sound absorbing material 63 is inserted between the dust-proofing cloth 62A and the dust-proofing cloth 62B, peripheries of which are then sewed together. Both ends of the dust-proofing cloths are secured on the front cabinet 21A and the lens moving device 11 by a first fastening metal 64 and a second fastening metal 65. This structure provides a feature in that dust-proofing quality is maintained as well as sound absorbing function, thereby reducing the radiation of the inside noise. Furthermore, if the dust-proofing cloth 62A and the dust-proofing cloth 62B are formed of a material having a conductivity, such as metal fibers, the electromagnetic wave noise from the circuit unit 13, etc., is absorbed, whereby the electromagnetic wave noise from the imaging apparatus can be reduced.

Figure 14:
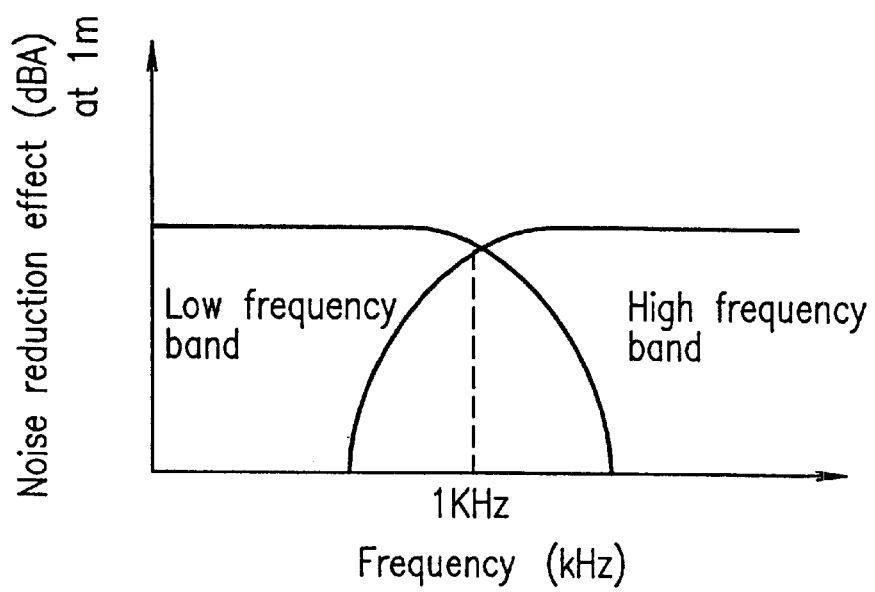
FIG. 14 is a graph illustrating the noise reduction effects of the projection-type imaging apparatus according to the examples.

The effects of the imaging apparatus according to the examples will now be described. FIG. 14 shows the noise reduction effect by the exhaust duct and the air intake duct according to the example, and the noise reduction effect by the active muffling device according to the examples.

It is understood that there is a noise reduction effect in the high frequency band at about 1 KHz or higher by means of the structure of the air intake duct and the sound absorbing function of the sound absorbing material. It is understood that there is a noise reduction effect in the low frequency band at about 1 KHz or lower by means of the sound absorbing function by the active muffling device. Accordingly, by combining the passive noise reduction by means of the structure of the exhaust duct and the active noise reduction, it is possible to reduce the noise in the entire noise band.

FIG. 15 shows specific effects according to Examples 1 to 3 of the present invention. FIG. 15 shows the results of the noise measurement before and after the implementation of the present invention at the position which is 1 m away to the front, rear, left, right and above, respectively, from the imaging apparatus. It is confirmed from FIG. 15 that there is a noise reduction effect specifically at the rear of the imaging apparatus by means of the exhaust duct and that a maximum effect of 7 dBA is achieved. In addition, it is confirmed that a noise reduction of 9 to 17 dBA is achieved by means of the exterior cabinet which has an exhaust port only on the backside. Furthermore, the noise level at the rear shows at least 4 dBA of noise reduction effected by means of the active muffling device.

Figure 16:
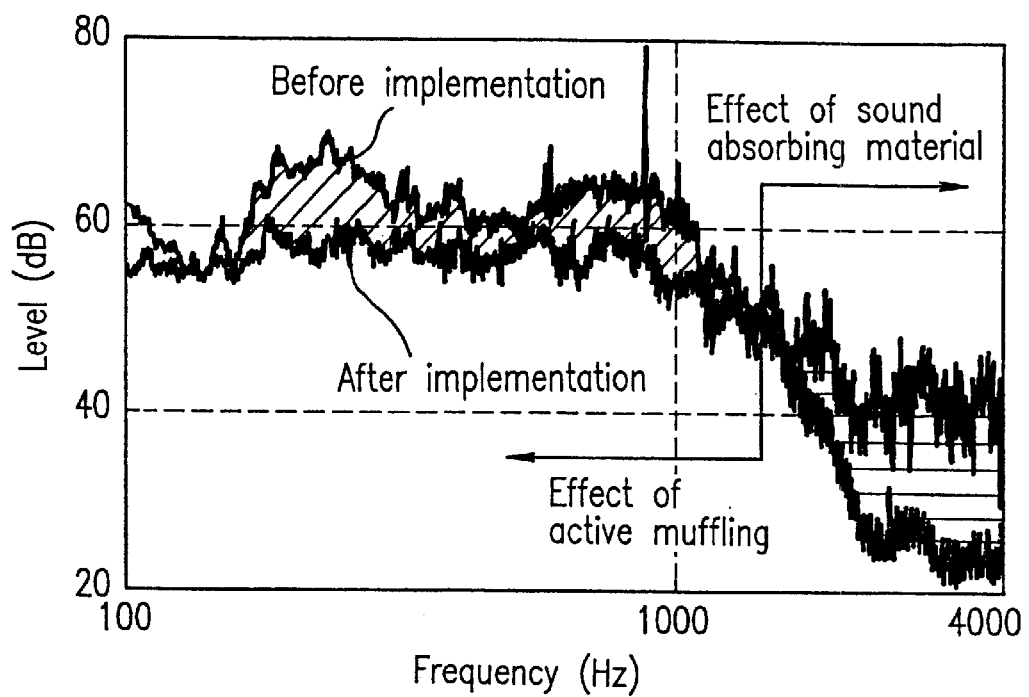
FIG. 16 is a graph analyzing the noise frequency of the projection-type imaging apparatuses according to Examples 1 to 4.

FIG. 16 shows an analysis result of the noise frequency before and after the implementation of the present invention. According to FIG. 16, it is confirmed that an average noise reduction effect of 6 dBA (maximum 15 dBA) is achieved by the active muffling device at a frequency of 1 KHz or lower, and that a significant noise reduction is achieved by the sealed cabinet structure, exhaust duct attached structure and the adhesion of the sound absorbing material at a frequency of 1 KHz or higher.

Figure 17:
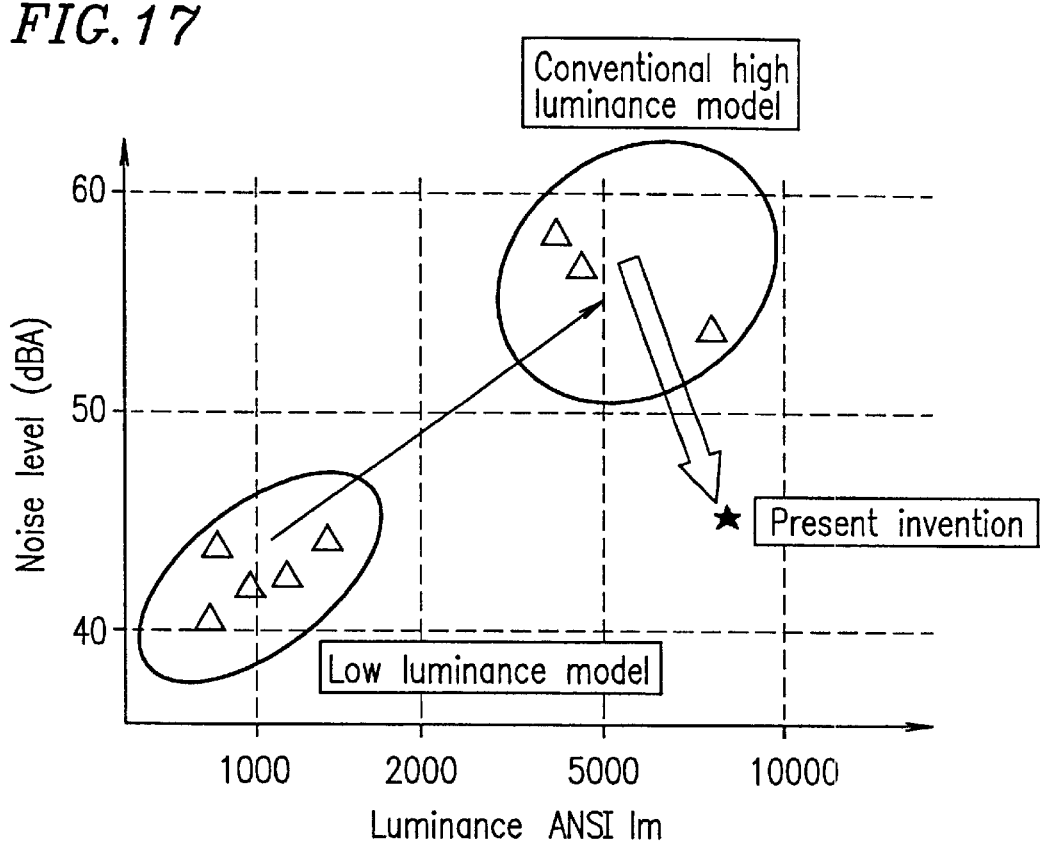
FIG. 17 is a graph illustrating the relationship between the luminance and the noise level of the projection-type imaging apparatuses according to Example 1 to 4.

FIG. 17 shows the relationship between luminance and noise level in a variety of imaging apparatuses. Conventionally, there is a general tendency that the noise level increases as the luminance increases since the cooling section is required to be more powerful. As shown in FIG. 17, although the luminance is increased the noise level according to the present invention is similar to that of the low-luminance model. This confirms that an excellent silence characteristic is achieved.

EXAMPLE 5

Figure 18:
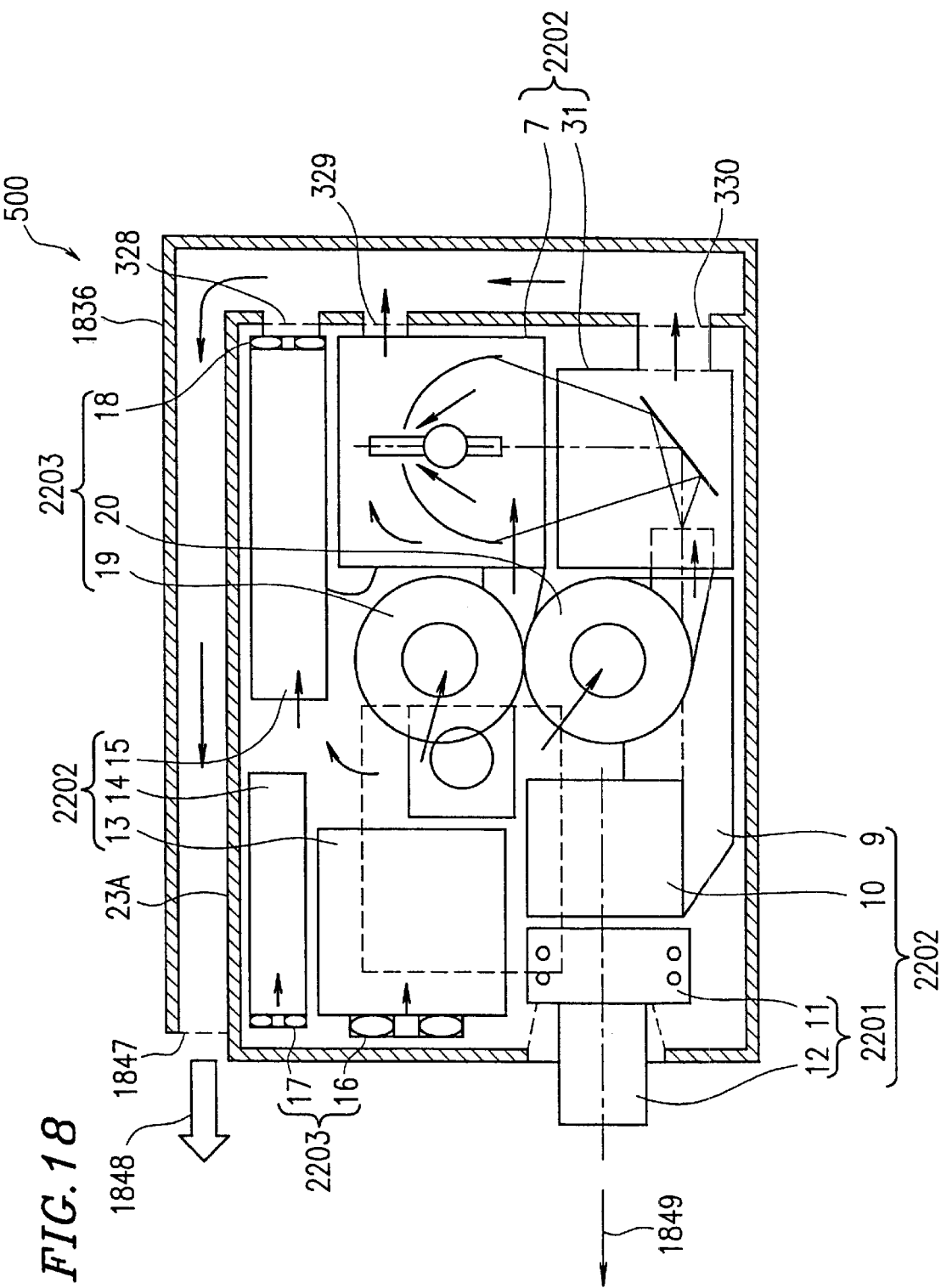
FIG. 18 is a cross-sectional plan view of a projection-type imaging apparatus according to Example 5.

FIG. 18 is a cross-sectional plan view of a projection-type imaging apparatus 500 according to Example 5. Components similar to those of the imaging apparatus 100 will be denoted by the same reference numerals, and detailed explanation thereof will be omitted. Examples 1 to 4, to which the subject invention is not limited, show examples in which the exhaust duct exhausts the air in the direction opposite to the direction in which the projection lens projects an image onto the screen (backward). As shown in FIG. 18, the exhaust duct 1836 may exhaust the air from the exhaust port 1847 in a direction 1848 which is substantially the same as the direction 1849 in which the projection lens 12 projects an image onto the screen. The exhaust duct 1836 is provided so as to extend along the second side cabinet 23A.

EXAMPLE 6

Figure 19:
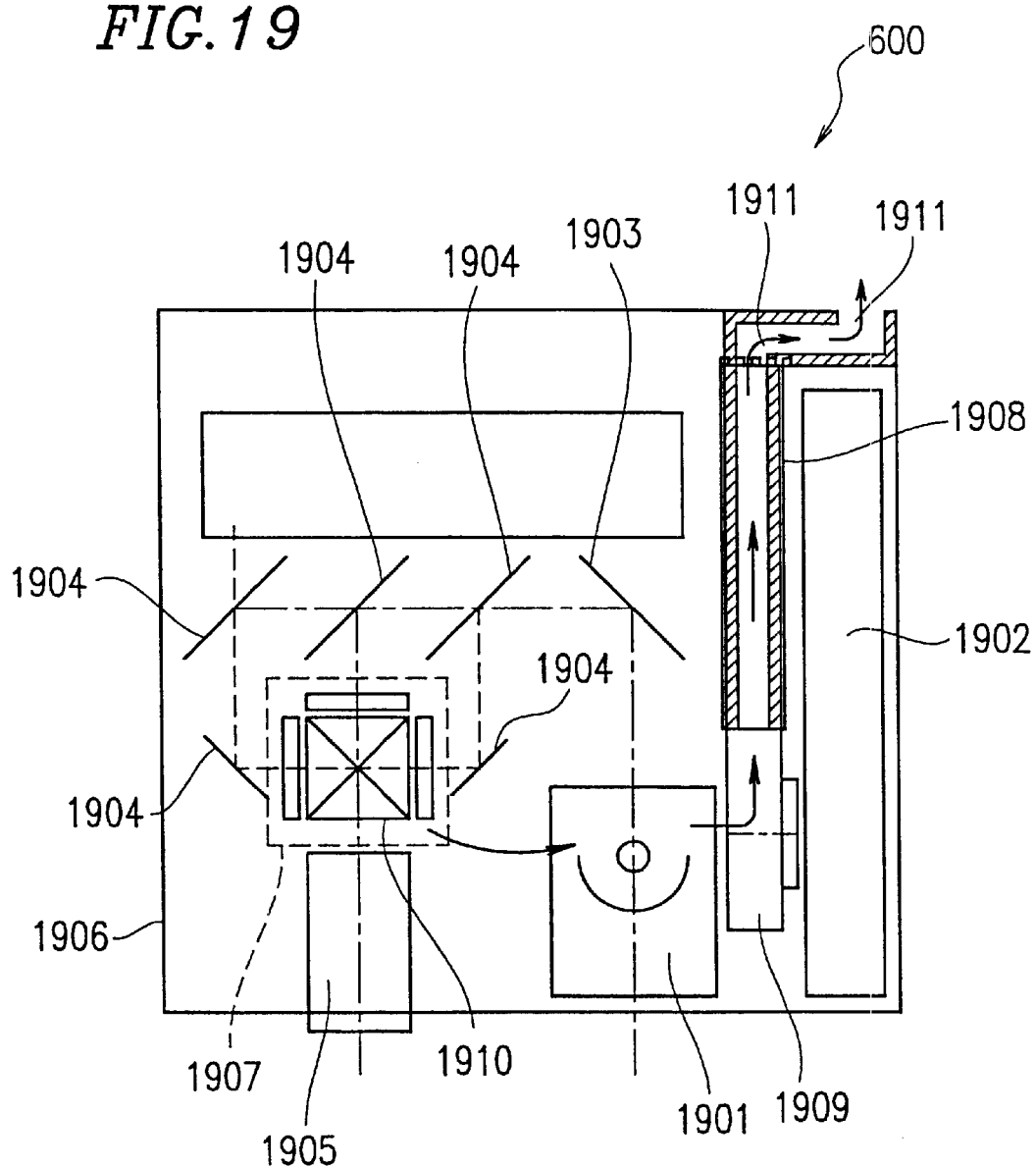
FIG. 19 is a cross-sectional plan view of a liquid crystal projector according to Example 6.

FIG. 19 is a cross-sectional plan view of a liquid crystal projector 600 according to Example 6. Aforementioned Examples 1 to 5, to which the subject invention is not limited, show examples in which the present invention is implemented in a projection-type imaging apparatus. As illustrated in FIG. 19, the present invention is also implemented in a liquid crystal projector.

The liquid crystal projector 600 includes an exterior cabinet 1906, a lamp 1901, a mirror 1903, a dichroic mirror 1904, a liquid crystal panel 1910, a projection lens 1905, a cooling fan 1909, and a power supply 1902.

The exterior cabinet 1906 is provided with an exhaust duct 1908 which has an L shape so as to guide the noise caused by the cooling fan 1909 and the air taken in from the air intake 1907, to the outside of the exterior cabinet 1906.

The noise strikes an interior face of the exhaust duct 1908 and is attenuated, and then changes its direction of movement as indicated by an arrow 1911 and is guided outside the exterior cabinet 1906.

EXAMPLE 7

Figure 20:
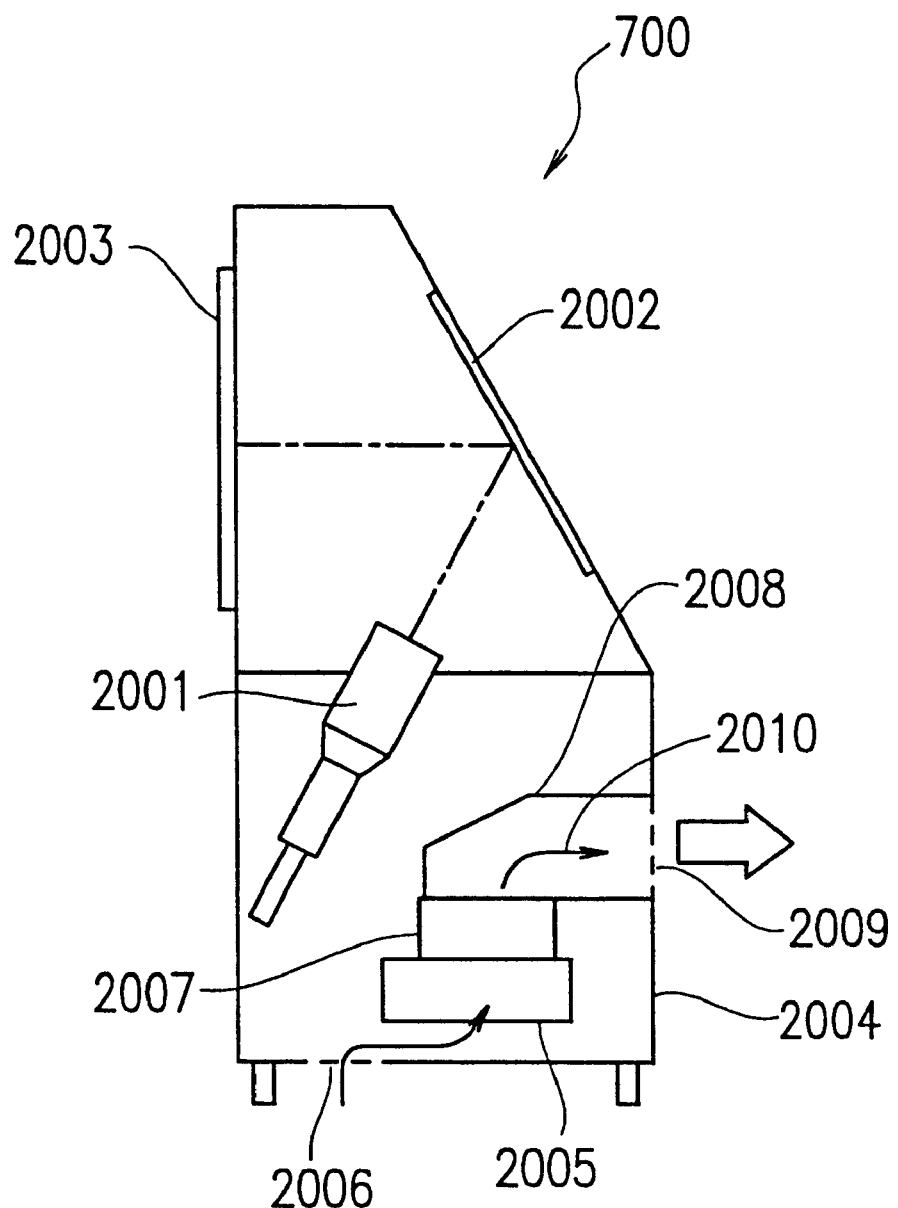
FIG. 20 is a cross-sectional side view of a rear-projection television according to Example 7.

FIG. 20 is a cross-sectional side view of a rear-projection television 700 according to Example 7. Aforementioned Examples 1 to 5 show examples in which the present invention is implemented in a projection-type imaging apparatus, and Example 6 shows an example in which the present invention is implemented in a liquid crystal projector. The present invention is not limited to these examples. As illustrated in FIG. 20, the present invention can also be implemented in a rear-projection television.

The rear-projection television 700 includes an exterior cabinet 2004, an imaging tube 2001, a mirror 2002, a screen 2003, a drive circuit 2005, and a cooling fan 2007.

The exterior cabinet 2004 is provided with an exhaust duct 2008 for guiding the noise caused by the cooling fan 2007 and the air taken in from the air intake 2006, to the outside of the exterior cabinet 2004. The noise strikes an interior face of the exhaust duct 2008 and is attenuated, and then changes its direction of movement as indicated by an arrow 2010 and is guided outside the exterior cabinet 2004.

INDUSTRIAL APPLICABILITY

As described above, according to the present invention, it is possible to provide an imaging apparatus which is capable of controlling emission of the noise caused by the cooling section so as to suppress the noise coming from the device, even in the case where a large cooling section is used for cooling a projection section with a high output needed for obtaining images with higher luminance.

Moreover, according to the present invention, it is possible to provide an imaging apparatus which is capable of preventing light emitted from the light source lamp unit from illuminating places other than the screen.

What is claimed is:

1. An imaging apparatus comprising:
   a projection section for projecting an image onto a screen;
   a cooling section for cooling the projection section by means of air;
   an exterior cabinet for housing the projection section and the cooling section; and
   an exhaust section for exhausting the air used for the cooling of the projection section by the cooling section, from the exterior cabinet;
   wherein:
      the exhaust section has a function for attenuating a noise caused by the cooling section;
      the projection section comprises a light source lamp unit, an emission optical unit for collecting light from the light source lamp unit, an imaging element unit for generating optical picture information using light collected by the emission optical unit, and a projection lens unit for enlarging and projecting the optical picture information;
      the projection lens unit comprises a projection lens and a projection lens moving device for moving the projection lens; and the exterior cabinet has a front face which is formed at the side of the screen, the exterior cabinet further comprising a dust-proofing section which is provided between the front face and the projection lens moving device, for preventing outside dust from entering the apparatus; wherein the dust-proofing section comprises at least two pieces of cloth, and a sound absorbing material inserted between the two pieces of cloth.

2. An imaging apparatus according to claim 1, wherein:

the exhaust section comprises an exhaust duct having a ventilation path for guiding the noise and the air from the projection section to the exterior of the exterior cabinet; and the ventilation path is formed so that the noise strikes an interior surface of the ventilation path and changes its direction of movement.

3. An imaging apparatus according to claim 2, wherein the ventilation path is formed so that the moving path of the noise contains at least one L shape.

4. An imaging apparatus according to claim 2, wherein the exhaust duct comprises a sound absorption material which is provided on the interior surface of the ventilation path for absorbing the noise.

5. An imaging apparatus according to claim 2, wherein:

the exterior cabinet has a rear face which is formed on a side opposite to the screen;

the exhaust duct is provided on the location corresponding to the rear face; and the exhaust duct exhausts air in a direction which is opposite to the direction in which the projection section projects the image onto the screen.

6. An imaging apparatus according to claim 2, wherein the exhaust duct exhausts the air in a direction which is substantially the same as the direction in which the projection section projects the image onto the screen.

7. An imaging apparatus according to claim 2, wherein the exhaust duct comprises at least one active muffling device provided in the ventilation path.

8. An imaging apparatus according to claim 1, wherein:

the cooling section comprises a lamp cooling fan for cooling the light source lamp unit, and a mirror cooling fan for cooling the emission optical unit.

9. An imaging apparatus according to claim 8, wherein:

the projection section further comprises a circuit unit for controlling the imaging element unit, a power supply unit for driving the circuit unit; and a light source lamp power supply unit for driving the light source lamp unit; and the cooling section further comprises a first cooling fan for cooling the circuit unit, a second cooling fan for cooling the power supply unit, and a third cooling fan for cooling the light source lamp power supply unit.

10. An imaging apparatus according to claim 1, wherein the cooling section comprises a cooling fan.

11. An imaging apparatus according to claim 1 further comprising an air intake section for taking in air from outside the exterior cabinet and providing air to the cooling section.

12. An imaging apparatus according to claim 11, wherein:

the air intake section comprises an air intake duct for guiding air from the exterior of the exterior cabinet to the cooling section and for guiding the noise from the projection section to the exterior of the exterior cabinet; and the ventilation path is formed so that the noise strikes an interior surface of the ventilation path and changes its direction of movement.

13. An imaging apparatus according to claim 12, wherein the ventilation path is formed so that the moving path of the noise has at least one L shape.

14. An imaging apparatus according to claim 12, wherein the air intake duct comprises a sound absorption material which is provided on the interior surface of the ventilation path for absorbing the noise.

15. An imaging apparatus according to claim 12, wherein:

the air intake duct is provided at a position corresponding to the lower face of the exterior cabinet.

16. An imaging apparatus according to claim 12, wherein the air intake duct comprises at least one active muffling device provided in the ventilation path.

17. An imaging apparatus according to claim 1, wherein the exterior cabinet comprises a sound absorption material which is provided on at least one of interior surfaces of the exterior cabinet for absorbing the noise.

18. An imaging apparatus according to claim 1, wherein the imaging apparatus is a projection-type imaging apparatus.

19. An imaging apparatus according to claim 1, wherein the imaging apparatus is a liquid crystal projector.

20. An imaging apparatus according to claim 1, wherein the imaging apparatus is a rear-projection television.

* * * * *